US011296815B2

(12) United States Patent
Li et al.

(10) Patent No.: US 11,296,815 B2
(45) Date of Patent: Apr. 5, 2022

(54) TERMINAL DEVICE AND METHOD FOR FACILITATING COMMUNICATION BETWEEN TERMINAL DEVICES

(71) Applicant: Telefonaktiebolaget LM Ericsson (publ), Stockholm (SE)

(72) Inventors: Shaohua Li, Beijing (CN); Ricardo Blasco Serrano, Stockholm (SE); Mikael Fallgren, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 72 days.

(21) Appl. No.: 16/496,938

(22) PCT Filed: Mar. 23, 2018

(86) PCT No.: PCT/CN2018/080203
§ 371 (c)(1),
(2) Date: Sep. 23, 2019

(87) PCT Pub. No.: WO2018/171716
PCT Pub. Date: Sep. 27, 2018

(65) Prior Publication Data
US 2020/0136746 A1 Apr. 30, 2020

(30) Foreign Application Priority Data

Mar. 24, 2017 (WO) ................ PCT/CN2017/078070

(51) Int. Cl.
*H04L 1/00* (2006.01)
*H04L 1/18* (2006.01)
(Continued)

(52) U.S. Cl.
CPC .......... *H04L 1/0003* (2013.01); *H04L 1/1861* (2013.01); *H04L 27/0012* (2013.01); *H04L 27/36* (2013.01); *H04W 92/18* (2013.01)

(58) Field of Classification Search
CPC .... H04L 1/0003; H04L 1/0016; H04W 28/06; H04W 4/46
See application file for complete search history.

(56) References Cited

U.S. PATENT DOCUMENTS

2014/0169297 A1* 6/2014 Kim ...................... H04L 1/0016
370/329
2015/0036590 A1 2/2015 Lahetkangas et al.
(Continued)

FOREIGN PATENT DOCUMENTS

| CN | 105099627 A | 11/2015 |
|----|-------------|---------|
| CN | 106464647 A | 2/2017  |
| EP | 2933969 A1  | 10/2015 |

OTHER PUBLICATIONS

3GPP, "Reply LS on AGC and Frequency Error for D2D", 3GPP TSG-RAN WG4 Meeting #70, R4-141241, San Francisco, USA, Feb. 10-14, 2014, 1 page.
(Continued)

*Primary Examiner* — Elton Williams
(74) *Attorney, Agent, or Firm* — NDWE LLP (57) ABSTRACT

A method in a first terminal device for facilitating direct communication with a second terminal device. The method comprises transmitting to the second terminal device a Modulation and Coding Scheme (MCS) index, based on which the second terminal device can obtain a modulation order and a Transport Block Size (TBS) in accordance with a first mapping or a second mapping between MCS indices on one hand and modulation orders and TBSs on the other. The MCS index is determined by the first terminal device by selectively applying the first or second mapping.

13 Claims, 3 Drawing Sheets

(51) Int. Cl.
  *H04L 27/00* (2006.01)
  *H04L 27/36* (2006.01)
  *H04W 92/18* (2009.01)

(56) References Cited

U.S. PATENT DOCUMENTS

| | | | |
|---|---|---|---|
| 2015/0215068 | A1 | 7/2015 | Wu |
| 2016/0183276 | A1* | 6/2016 | Marinier ............... H04W 72/04 370/329 |
| 2018/0241499 | A1* | 8/2018 | Einhaus ................ H04L 5/0096 |
| 2019/0260559 | A1* | 8/2019 | Wu ....................... H04L 1/1874 |
| 2020/0076722 | A1* | 3/2020 | Kim ....................... H04W 4/90 |

OTHER PUBLICATIONS

International Preliminary Reporton Patentability received for PCT Patent Application No. PCT/CN2018/080203, completed on Jul. 5, 2019, 14 pages.
3GPP TS 36.212 V14.1.1 (Jan. 2017), 3rd Generation Partnership Project; Technical Specification Group Radio Access Network; Evolved Universal Terrestrial Radio Access (E-UTRA); Multiplexing and channel coding (Release 14), Jan. 2017, 149 pages.
3GPP TSG RAN Meeting #75, RP-170798, Agenda Item: 10.1.1, New WID on 3GPP V2X Phase 2, Dubrovnik, Croatia, Mar. 6-9, 2017, 5 pages.
International Search Report and Written Opinion received for PCT Patent Application No. PCT/CN2018/080203, dated Jun. 21, 2018, 10 pages.
European Communication pursuant to Article 94(3) EPC, EP App. No 18772455.4, dated Oct. 7, 2020, 7 pages.
Examination Report, IN App. No. 201947038205, dated Dec. 17, 2020, 8 pages.
Samsung, "On TBS and Soft Buffer Size", 3GPP TSG RAN WG1 #88, R1-1702862, Feb. 13-17, 2017, 3 pages.
Supplementary European Search Report and Search Opinion, EP App. No 18772455.4, dated Jan. 24, 2020, 10 pages.
Intention to Grant, EP Application No. 18772455.4, dated Apr. 28, 2021, 74 pages.
Decision to grant a European patent, EP App. No. 18772455.4, dated Aug. 19, 2021, 2 pages.
European Search Report and Search Opinion, EP App. No. 21190966.8, dated Dec. 13, 2021, 10 pages.

* cited by examiner

TERMINAL DEVICE AND METHOD FOR FACILITATING COMMUNICATION BETWEEN TERMINAL DEVICES

CROSS-REFERENCE TO RELATED APPLICATIONS

This application is a National stage of International Application No. PCT/CN2018/080203, filed Mar. 23, 2018, which claims priority to International Application No. PCT/CN2017/078070, filed Mar. 24, 2017, which are all hereby incorporated by reference.

TECHNICAL FIELD

The present disclosure relates to communication technology, and more particularly, to a terminal device and a method for facilitating direct communication between terminal devices.

BACKGROUND

Vehicle to Vehicle/Pedestrian/Infrastructure/Network (V2X) has been standardized in Long Term Evolution (LTE) Release 14. According to the Release 14 standard, only Quadrature Phase Shift Keying (QPSK) and 16 Quadrature Amplitude Modulation (QAM) are supported for sidelink communications. In RAN #75 meeting, a new work item for V2X was approved in RP-170798, New WID on 3GPP V2X Phase 2, 3gpp, March, 2017. One of the objectives in this work item is introduction of 64QAM. That is, Release 15 V2X terminals are required to support 64QAM.

In the Release 14 V2X, modulation orders and Transport Block Size (TBS) indices are determined from a "Modulation and Coding Scheme (MCS)" field in a Sidelink Control Information (SCI) format. The MCS field contains an MCS index, based on which the corresponding modulation order and TBS can be obtained. The scheme for determining modulation orders and TBSs for Physical Uplink Shared Channel (PUSCH) in the LTE is reused in Physical Sidelink Shared Channel (PSSCH). Table 1 below shows a mapping from MCS indices ($I_{MCS}$) to modulation orders ($Q'_m$) and TBS indices ($I_{TBS}$) in the Release 14 V2X.

TABLE 1

Mapping from $I_{MCS}$ to $Q'_m$ and $I_{TBS}$ for Release 14 V2X

| MCS Index $I_{MCS}$ | Modulation Order $Q'_m$ | TBS Index $I_{TBS}$ | Coding Rate (no retransmission) |
|---|---|---|---|
| 0 | 2 | 0 | 0.10 |
| 1 | 2 | 1 | 0.15 |
| 2 | 2 | 2 | 0.25 |
| 3 | 2 | 3 | 0.31 |
| 4 | 2 | 4 | 0.36 |
| 5 | 2 | 5 | 0.39 |
| 6 | 2 | 6 | 0.44 |
| 7 | 2 | 7 | 0.57 |
| 8 | 2 | 8 | 0.68 |
| 9 | 2 | 9 | 0.79 |
| 10 | 2 | 10 | 0.44 |
| 11 | 4 | 10 | 0.88 |
| 12 | 4 | 11 | 0.51 |
| 13 | 4 | 12 | 0.59 |
| 14 | 4 | 13 | 0.65 |
| 15 | 4 | 14 | 0.73 |
| 16 | 4 | 15 | 0.78 |
| 17 | 4 | 16 | 0.84 |
| 18 | 4 | 17 | 0.92 |
| 19 | 4 | 18 | 1.01 |
| 20 | 4 | 19 | 1.12 |
| 21 | 4 | 19 | 1.12 |
| 22 | 4 | 20 | 1.20 |
| 23 | 4 | 21 | 1.28 |
| 24 | 4 | 22 | 1.40 |
| 25 | 4 | 23 | 1.51 |
| 26 | 4 | 24 | 1.56 |
| 27 | 4 | 25 | 1.62 |
| 28 | 4 | 26 | 1.92 |
| 29 | Reserved | | |
| 30 | | | |
| 31 | | | |

Table 1 also shows coding rates corresponding to the modulation orders and TBS indices, with no retransmission assumed. Theoretically, a coding rate higher than one would render a transport block not decodable by a receiver. In practice, a transport block having a coding rate higher than a smaller threshold, e.g., 0.93 as discussed in Release 8, would not be decodable. In either criterion, it can be seen from Table 1 that, for $19 \leq I_{MCS} \leq 28$, the coding rates are too high to be decodable at a receiver. In other words, the above Release 14 mapping does not "support" those MCSs in the sense that they are not decodable.

In order to introduce 64QAM, a straightforward way is to reuse the mapping for PUSCH in LTE, as shown in Table 2 below.

TABLE 2

Mapping from $I_{MCS}$ to $Q'_m$ and $I_{TBS}$ for PUSCH

| MCS Index $I_{MCS}$ | Modulation Order $Q'_m$ | TBS Index $I_{TBS}$ | Coding Rate (no retransmission) |
|---|---|---|---|
| 0 | 2 | 0 | 0.10 |
| 1 | 2 | 1 | 0.15 |
| 2 | 2 | 2 | 0.25 |
| 3 | 2 | 3 | 0.31 |
| 4 | 2 | 4 | 0.36 |
| 5 | 2 | 5 | 0.39 |
| 6 | 2 | 6 | 0.44 |
| 7 | 2 | 7 | 0.57 |
| 8 | 2 | 8 | 0.68 |
| 9 | 2 | 9 | 0.79 |
| 10 | 2 | 10 | 0.44 |
| 11 | 4 | 10 | 0.88 |
| 12 | 4 | 11 | 0.51 |
| 13 | 4 | 12 | 0.59 |
| 14 | 4 | 13 | 0.65 |
| 15 | 4 | 14 | 0.73 |
| 16 | 4 | 15 | 0.78 |
| 17 | 4 | 16 | 0.84 |
| 18 | 4 | 17 | 0.92 |
| 19 | 4 | 18 | 1.01 |
| 20 | 4 | 19 | 1.12 |
| 21 | 6 | 19 | 0.75 |
| 22 | 6 | 20 | 1.80 |
| 23 | 6 | 21 | 0.85 |
| 24 | 6 | 22 | 0.93 |
| 25 | 6 | 23 | 1.01 |
| 26 | 6 | 24 | 1.04 |

TABLE 2-continued

Mapping from $I_{MCS}$ to $Q'_m$ and $I_{TBS}$ for PUSCH

| MCS Index $I_{MCS}$ | Modulation Order $Q'_m$ | TBS Index $I_{TBS}$ | Coding Rate (no retransmission) |
|---|---|---|---|
| 27 | 6 | 25 | 1.08 |
| 28 | 6 | 26 | 1.28 |
| 29 | Reserved | | |
| 30 | | | |
| 31 | | | |

Note:
One OFDM symbol is used for the Automatic Gain Control (AGC) settling for QPSK and two for 16QAM/64QAM.

However, as can be seen in Table 2, even with the introduction of 64QAM, for $25 \leq I_{MCS} \leq 28$, the coding rates are still too high to be decodable, which would be inefficient for 64QAM transmissions.

Meanwhile, it is desired that Release 15 V2X terminals should be backward compatible. That is, Release 15 V2X terminals shall co-exist with Release 14 V2X terminals in the same resource pools and use the same scheduling assignment format (which can be decoded by legacy terminals). Eventually, the Release 14 and Release 15 V2X terminals shall be able to communicate with each other directly over sidelink, which requires the Release 14 V2X terminals to be able to decode PSSCH transmitted from the Release 15 V2X terminals, and vice versa.

SUMMARY

It is an object of the present disclosure to provide a terminal device and a method for facilitating direct communication between terminal devices, capable of solving at least one of the above problems.

According to a first aspect of the present disclosure, a method in a first terminal device for facilitating direct communication with a second terminal device is provided. The method comprises: transmitting to the second terminal device a Modulation and Coding Scheme (MCS) index, based on which the second terminal device can obtain a modulation order and a Transport Block Size (TBS) in accordance with a first mapping or a second mapping between MCS indices on one hand and modulation orders and TBSs on the other. The MCS index is determined by the first terminal device by selectively applying the first or second mapping.

In an embodiment, the second mapping supports a higher modulation order than those supported by the first mapping.

In an embodiment, the first and second mappings have an overlapped portion.

In an embodiment, the overlapped portion is associated with one or more of modulation orders supported by both the first and second mappings.

In an embodiment, the overlapped portion is associated with coding rates below a predefined threshold.

In an embodiment, in a portion of the second mapping that does not overlap the first mapping, each TBS associated with the second mapping is scaled down with respect to a corresponding TBS associated with the first mapping by a factor dependent on a number of Resource Elements, REs, available for data transmission.

In an embodiment, the MCS index is determined by the first terminal device by applying the first mapping when retransmission is configured, or the second mapping when no retransmission is configured and a modulation order and a TBS obtained by applying the first mapping would result in a coding rate higher than a predefined threshold.

In an embodiment, the method further comprises: transmitting to the second terminal device an indicator indicating which of the first and second mappings is applied by the first terminal device.

In an embodiment, the second terminal device supports the first mapping only.

In an embodiment, the first and second terminal devices are communicating directly with each other on a sidelink for vehicular services.

According to a second aspect of the present disclosure, a method in a first terminal device for facilitating direct communication with a second terminal device is provided. The method comprises: receiving from the second terminal device a Modulation and Coding Scheme (MCS) index determined by the second terminal device by applying a first mapping or a second mapping between MCS indices on one hand and modulation orders and Transport Block Sizes (TBSs) on the other; and obtaining, based on the MCS index, a modulation order and a TBS selectively in accordance with the first or second mapping.

In an embodiment, the second mapping supports a higher modulation order than those supported by the first mapping.

In an embodiment, the first and second mappings have an overlapped portion.

In an embodiment, the overlapped portion is associated with one or more of modulation orders supported by both the first and second mappings.

In an embodiment, the overlapped portion is associated with coding rates below a predefined threshold.

In an embodiment, in a portion of the second mapping that does not overlap the first mapping, each TBS associated with the second mapping is scaled down with respect to a corresponding TBS associated with the first mapping by a factor dependent on a number of Resource Elements, REs, available for data transmission.

In an embodiment, the modulation order and the TBS are obtained by the first terminal device in accordance with the first mapping when retransmission is configured, or with the second mapping when no retransmission is configured and a modulation order and a TBS obtained in accordance with the first mapping would result in a coding rate higher than a predefined threshold.

In an embodiment, the method further comprises: receiving from the second terminal device an indicator indicating which of the first and second mappings is applied by the second terminal device.

In an embodiment, the second terminal device supports the first mapping only.

In an embodiment, the first and second terminal devices are communicating directly with each other on a sidelink for vehicular services.

According to a third aspect of the present disclosure, a first terminal device in direct communication with a second terminal device is provided. The first terminal device comprises a transceiver, a processor and a memory. The memory comprises instructions executable by the processor whereby the first terminal device is operative to perform the method according to the above first or second aspect.

According to a fourth aspect of the present disclosure, a computer readable storage medium is provided. The computer readable storage medium has computer program instructions stored thereon. The computer program instructions, when executed by a processor in a first terminal device, cause the first terminal device to perform the method according to the above first or second aspect.

With the embodiments of the present disclosure, two mappings between MCS indices on one hand and modulation orders and TBSs on the other are provided. A terminal device supporting both mappings can selectively apply one of the two mappings, so as to communicate with another terminal device that may support only one mapping. Further, one of the two mappings can be designed to provide higher modulation orders and thus lower but decodable coding rates than the other. In this way, the MCSs can be more efficient.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be appreciated that the following embodiments are illustrative only, rather than limiting the scope of the disclosure.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

Figure 1:
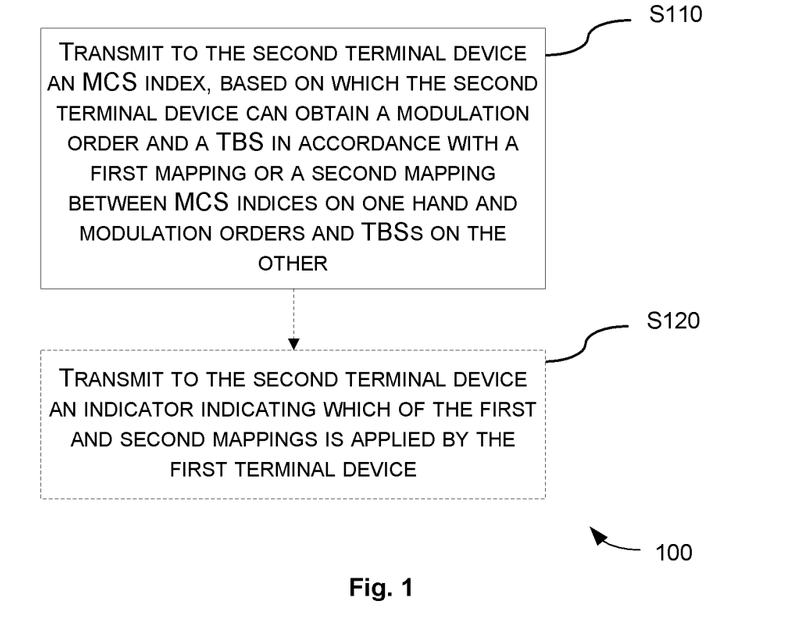
FIG. 1 is a flowchart illustrating a method for facilitating direct communication between terminals according to an embodiment of the present disclosure.

FIG. 1 is a flowchart illustrating a method 100 for facilitating direct communication between terminal devices according to an embodiment of the present disclosure. The method 100 can be performed at a first terminal device in direct communication with a second terminal device. The first and second terminal devices can communicate directly with each other on a sidelink for vehicular services. For example, the first terminal device can be a Release 15 V2X terminal as described above and the second terminal device can be a Release 14 or Release 15 V2X terminal.

It can be appreciated by those skilled in the art that the concept of the present disclosure is not limited to Release 14 or Release 15 V2X terminals, but applies generally to scenarios in which new and legacy terminals having different MCSs are in communication with each other. The method 100 includes the following step.

At step S110, an MCS index is transmitted to the second terminal device. Based on the MCS index, the second terminal device can obtain a modulation order and a TBS in accordance with a first mapping or a second mapping between MCS indices on one hand and modulation orders and TBSs on the other. The MCS index is determined by the first terminal device by selectively applying the first or second mapping.

Table 3 below shows an example of mappings from MCS indices ($I_{MCS}$) to modulation orders ($Q'_m$) and TBS indices ($I_{TBS}$). Table 4 shows corresponding mappings from TBS indices ($I_{TBS}$) to TBSs (in unit of bits). That is, the mappings between MCS indices and modulation orders are given by Table 3 alone, and the mappings between MCS indices and TBSs are given by Table 3 and Table 4 in combination. In other words, the first mapping described in the step S110 can be obtained from the second and third columns of Table 3 and the second column of Table 4, and the second mapping described in the step S110 can be obtained from the fourth and fifth columns of Table 3 and the third column of Table 4. In Table 4, the number of Physical Resource Blocks (PRBs), denoted as X, can be any valid number for allocated PRBs. Table 4 also shows coding rates of the first and second mappings.

TABLE 3

Mapping from $I_{MCS}$ to $Q'_m$ and $I_{TBS}$

| | 1st Mapping | | 2nd Mapping | |
|---|---|---|---|---|
| MCS Index $I_{MCS}$ | Modulation Order $Q'_m$ | TBS Index $I_{TBS}$ | Modulation Order $Q'_m$ | TBS Index $I_{TBS}$ |
| 0 | 2 | 0 | 2 | 0 |
| 1 | 2 | 1 | 2 | 1 |
| 2 | 2 | 2 | 2 | 2 |
| 3 | 2 | 3 | 2 | 3 |
| 4 | 2 | 4 | 2 | 4 |
| 5 | 2 | 5 | 2 | 5 |
| 6 | 2 | 6 | 2 | 6 |
| 7 | 2 | 7 | 2 | 7 |
| 8 | 2 | 8 | 2 | 8 |
| 9 | 2 | 9 | 2 | 9 |
| 10 | 2 | 10 | 2 | 10 |
| 11 | 4 | 10 | 4 | 10 |
| 12 | 4 | 11 | 4 | 11 |
| 13 | 4 | 12 | 4 | 12 |
| 14 | 4 | 13 | 4 | 13 |
| 15 | 4 | 14 | 4 | 14 |
| 16 | 4 | 15 | 4 | 15 |
| 17 | 4 | 16 | 4 | 16 |
| 18 | 4 | 17 | 4 | 17 |
| 19 | 4 | 18 | 4 | 18 |
| 20 | 4 | 19 | 4 | 19 |
| 21 | 4 | 19 | 6 | 19 |
| 22 | 4 | 20 | 6 | 20 |
| 23 | 4 | 21 | 6 | 21 |
| 24 | 4 | 22 | 6 | 22 |
| 25 | 4 | 23 | 6 | 23 |
| 26 | 4 | 24 | 6 | 24 |
| 27 | 4 | 25 | 6 | 25 |
| 28 | 4 | 26 | 6 | 26 |
| 29 | | Reserved | | |
| 30 | | | | |
| 31 | | | | |

TABLE 4

Mappings from TBS indices to TBSs

| | 1st Mapping | 2nd Mapping | 1st Mapping | 2nd Mapping |
|---|---|---|---|---|
| | PRB | | Coding | Coding |
| $I_{TBS}$ | X | X | Rate | Rate |
| 0 | 56 | 56 | 0.10 | 0.10 |
| 1 | 88 | 88 | 0.15 | 0.15 |

TABLE 4-continued

Mappings from TBS indices to TBSs

| $I_{TBS}$ | 1st Mapping PRB X | 2nd Mapping PRB X | 1st Mapping Coding Rate | 2nd Mapping Coding Rate |
|---|---|---|---|---|
| 2 | 144 | 144 | 0.25 | 0.25 |
| 3 | 176 | 176 | 0.31 | 0.31 |
| 4 | 208 | 208 | 0.36 | 0.36 |
| 5 | 224 | 224 | 0.39 | 0.39 |
| 6 | 256 | 256 | 0.44 | 0.44 |
| 7 | 328 | 328 | 0.57 | 0.57 |
| 8 | 392 | 392 | 0.68 | 0.68 |
| 9 | 456 | 456 | 0.79 | 0.79 |
| 10 | 504 | 504 | 0.44 | 0.44 |
| 11 | 584 | 584 | 0.51 | 0.51 |
| 12 | 680 | 680 | 0.59 | 0.59 |
| 13 | 744 | 744 | 0.65 | 0.65 |
| 14 | 840 | 840 | 0.73 | 0.73 |
| 15 | 904 | 904 | 0.78 | 0.78 |
| 16 | 968 | 968 | 0.84 | 0.84 |
| 17 | 1064 | 1064 | 0.92 | 0.92 |
| 18 | 1160 | 1160 | 1.01 | 1.01 |
| 19 | 1288 | 752 | 1.12 | 0.85 |
| 20 | 1384 | 808 | 1.2 | 0.47 |
| 21 | 1480 | 864 | 1.28 | 0.50 |
| 22 | 1608 | 944 | 1.4 | 0.54 |
| 23 | 1736 | 1016 | 1.51 | 0.59 |
| 24 | 1800 | 1056 | 1.56 | 0.61 |
| 25 | 1864 | 1088 | 1.62 | 0.63 |
| 26 | 2216 | 1296 | 1.92 | 0.75 |

In this example, the second mapping can support a higher modulation order (e.g., 64QAM) than those supported by the first mapping (e.g., QPSK and 16QAM).

Moreover, in this example, the first and second mappings have an overlapped portion ($0 \leq I_{MCS} \leq 20$). The overlapped portion is associated with modulation orders supported by both the first and second mappings (i.e., QPSK and 16QAM).

With the overlapped portion, even if the second terminal device supports the first mapping only and the first terminal device determines the MCS index by applying the second mapping, the second terminal device can have the same understanding of the modulation order and TBS as the first terminal device as long as the determined MCS index is within the overlapped portion.

In a portion of the second mapping that does not overlap the first mapping ($21 \leq I_{MCS} \leq 28$), each TBS associated with the second mapping can be scaled down with respect to a corresponding TBS associated with the first mapping by a factor dependent on a number of Resource Elements (REs) (or OFDM symbols) available for data transmission.

In this example, assuming that 12 OFDM symbols are available for data transmission over PUSCH and 7 over PSSCH, the TBSs in the second mapping can be scaled down by a factor of 7/12 with respect to those in the first mapping ($19 \leq I_{TBS} \leq 26$). As can be seen from Table 4, for the second mapping, the coding rates for 64QAM ($19 \leq I_{TBS} \leq 26$) are lower than 0.93 and thus decodable.

Table 5 below shows another example of mappings from MCS indices ($I_{MCS}$) to modulation orders ($Q'_m$) and TBS indices ($I_{TBS}$). Table 6 shows corresponding mappings from TBS indices ($I_{TBS}$) to TBSs (in unit of bits). Similarly, the first mapping described in the step S110 can be obtained from the second and third columns of Table 5 and the second column of Table 6, and the second mapping described in the step S110 can be obtained from the fourth and fifth columns of Table 5 and the third column of Table 6.

TABLE 5

Mapping from $I_{MCS}$ to $Q'_m$ and $I_{TBS}$

| MCS Index $I_{MCS}$ | 1st Mapping Modulation Order $Q'_m$ | 1st Mapping TBS Index $I_{TBS}$ | 2nd Mapping Modulation Order $Q'_m$ | 2nd Mapping TBS Index $I_{TBS}$ |
|---|---|---|---|---|
| 0 | 2 | 0 | 2 | 0 |
| 1 | 2 | 1 | 2 | 1 |
| 2 | 2 | 2 | 2 | 2 |
| 3 | 2 | 3 | 2 | 3 |
| 4 | 2 | 4 | 2 | 4 |
| 5 | 2 | 5 | 2 | 5 |
| 6 | 2 | 6 | 2 | 6 |
| 7 | 2 | 7 | 2 | 7 |
| 8 | 2 | 8 | 2 | 8 |
| 9 | 2 | 9 | 2 | 9 |
| 10 | 2 | 10 | 2 | 10 |
| 11 | 4 | 10 | 4 | 10 |
| 12 | 4 | 11 | 4 | 11 |
| 13 | 4 | 12 | 4 | 12 |
| 14 | 4 | 13 | 4 | 13 |
| 15 | 4 | 14 | 4 | 14 |
| 16 | 4 | 15 | 4 | 15 |
| 17 | 4 | 16 | 4 | 16 |
| 18 | 4 | 17 | 4 | 17 |
| 19 | 4 | 18 | 4 | 18 |
| 20 | 4 | 19 | 4 | 19 |
| 21 | 4 | 19 | 6 | 19 |
| 22 | 4 | 20 | 6 | 20 |
| 23 | 4 | 21 | 6 | 21 |
| 24 | 4 | 22 | 6 | 22 |
| 25 | 4 | 23 | 6 | 23 |
| 26 | 4 | 24 | 6 | 24 |
| 27 | 4 | 25 | 6 | 25 |
| 28 | 4 | 26 | 6 | 26 |
| 29 | Reserved | | | |
| 30 | | | | |
| 31 | | | | |

TABLE 6

Mappings from TBS Indices to TBSs

| $I_{TBS}$ | 1st Mapping PRB X | 2nd Mapping PRB X | 1st Mapping Coding Rate | 2nd Mapping Coding Rate |
|---|---|---|---|---|
| 0 | 56 | 56 | 0.10 | 0.10 |
| 1 | 88 | 88 | 0.15 | 0.15 |
| 2 | 144 | 144 | 0.25 | 0.25 |
| 3 | 176 | 176 | 0.31 | 0.31 |
| 4 | 208 | 208 | 0.36 | 0.36 |
| 5 | 224 | 224 | 0.39 | 0.39 |
| 6 | 256 | 256 | 0.44 | 0.44 |
| 7 | 328 | 328 | 0.57 | 0.57 |
| 8 | 392 | 392 | 0.68 | 0.68 |
| 9 | 456 | 456 | 0.79 | 0.79 |
| 10 | 504 | 504 | 0.44 | 0.44 |
| 11 | 584 | 584 | 0.51 | 0.51 |
| 12 | 680 | 680 | 0.59 | 0.59 |
| 13 | 744 | 744 | 0.65 | 0.65 |
| 14 | 840 | 840 | 0.73 | 0.73 |
| 15 | 904 | 904 | 0.78 | 0.78 |
| 16 | 968 | 968 | 0.84 | 0.84 |
| 17 | 1064 | 1064 | 0.92 | 0.92 |
| 18 | 1160 | 680 | 1.01 | 0.59 |
| 19 | 1288 | 752 | 1.12 | 0.65 |
| 20 | 1384 | 808 | 1.2 | 0.47 |
| 21 | 1480 | 864 | 1.28 | 0.50 |
| 22 | 1608 | 944 | 1.4 | 0.54 |

TABLE 6-continued

Mappings from TBS Indices to TBSs

| | 1st Mapping PRB | 2nd Mapping PRB | 1st Mapping | 2nd Mapping |
|---|---|---|---|---|
| $I_{TBS}$ | X | X | Coding Rate | Coding Rate |
| 23 | 1736 | 1016 | 1.51 | 0.59 |
| 24 | 1800 | 1056 | 1.56 | 0.61 |
| 25 | 1864 | 1088 | 1.62 | 0.63 |
| 26 | 2216 | 1296 | 1.99 | 0.75 |

In the example shown in Table 5 and Table 6, the first and second mappings have an overlapped portion ($0 \leq I_{MCS} \leq 18$). The overlapped portion is associated with coding rates below a predefined threshold (e.g., 0.93).

In the example shown in Table 5 and Table 6, in a portion of the second mapping that does not overlap the first mapping ($19 \leq I_{MCS} \leq 28$), each TBS associated with the second mapping can be scaled down with respect to a corresponding TBS associated with the first mapping by a factor dependent on a number of Resource Elements (REs) (or OFDM symbols) available for data transmission. Again, the factor can be e.g., 7/12.

Table 7 below shows yet another example of mappings from MCS indices ($I_{MCS}$) to modulation orders ($Q'_m$) and TBS indices ($I_{TBS}$). Table 8 shows corresponding mappings from TBS indices ($I_{TBS}$) to TBSs (in unit of bits). Similarly, the first mapping described in the step S110 can be obtained from the second and third columns of Table 7 and the second column of Table 8, and the second mapping described in the step S110 can be obtained from the fourth and fifth columns of Table 7 and the third column of Table 8. Compared with the previous examples, here the first and second mappings have a smaller overlapped portion ($0 \leq I_{MCS} \leq 4$).

TABLE 7

Mapping from $I_{MCS}$ to $Q'_m$ and $I_{TBS}$

| | 1st Mapping | | 2nd Mapping | |
|---|---|---|---|---|
| MCS Index $I_{MCS}$ | Modulation Order $Q'_m$ | TBS Index $I_{TBS}$ | Modulation Order $Q'_m$ | TBS Index $I_{TBS}$ |
| 0 | 2 | 0 | 2 | 0 |
| 1 | 2 | 1 | 2 | 1 |
| 2 | 2 | 2 | 2 | 2 |
| 3 | 2 | 3 | 2 | 3 |
| 4 | 2 | 4 | 2 | 4 |
| 5 | 2 | 5 | 4 | 5 |
| 6 | 2 | 6 | 4 | 6 |
| 7 | 2 | 7 | 4 | 7 |
| 8 | 2 | 8 | 4 | 8 |
| 9 | 2 | 9 | 4 | 9 |
| 10 | 2 | 10 | 6 | 10 |
| 11 | 4 | 10 | 6 | 10 |
| 12 | 4 | 11 | 6 | 11 |
| 13 | 4 | 12 | 6 | 12 |
| 14 | 4 | 13 | 6 | 13 |
| 15 | 4 | 14 | 6 | 14 |
| 16 | 4 | 15 | 6 | 15 |
| 17 | 4 | 16 | 6 | 16 |
| 18 | 4 | 17 | 6 | 17 |
| 19 | 4 | 18 | 6 | 18 |
| 20 | 4 | 19 | 6 | 19 |
| 21 | 4 | 19 | 6 | 19 |
| 22 | 4 | 20 | 6 | 20 |
| 23 | 4 | 21 | 6 | 21 |
| 24 | 4 | 22 | 6 | 22 |
| 25 | 4 | 23 | 6 | 23 |

TABLE 7-continued

Mapping from $I_{MCS}$ to $Q'_m$ and $I_{TBS}$

| | 1st Mapping | | 2nd Mapping | |
|---|---|---|---|---|
| MCS Index $I_{MCS}$ | Modulation Order $Q'_m$ | TBS Index $I_{TBS}$ | Modulation Order $Q'_m$ | TBS Index $I_{TBS}$ |
| 26 | 4 | 24 | 6 | 24 |
| 27 | 4 | 25 | 6 | 25 |
| 28 | 4 | 26 | 6 | 26 |
| 29 | Reserved | | | |
| 30 | | | | |
| 31 | | | | |

TABLE 8

Mappings from TBS Indices to TBSs

| | 1st Mapping PRB | 2nd Mapping PRB | 1st Mapping | 2nd Mapping |
|---|---|---|---|---|
| $I_{TBS}$ | X | X | Coding Rate | Coding Rate |
| 0 | 56 | 56 | 0.10 | 0.10 |
| 1 | 88 | 88 | 0.15 | 0.15 |
| 2 | 144 | 144 | 0.25 | 0.25 |
| 3 | 176 | 176 | 0.31 | 0.31 |
| 4 | 208 | 208 | 0.36 | 0.36 |
| 5 | 224 | 224 | 0.39 | 0.20 |
| 6 | 256 | 256 | 0.44 | 0.22 |
| 7 | 328 | 328 | 0.57 | 0.29 |
| 8 | 392 | 392 | 0.68 | 0.34 |
| 9 | 456 | 456 | 0.79 | 0.40 |
| 10 | 504 | 504 | 0.44 | 0.15 |
| 11 | 584 | 584 | 0.51 | 0.34 |
| 12 | 680 | 680 | 0.59 | 0.39 |
| 13 | 744 | 744 | 0.65 | 0.43 |
| 14 | 840 | 840 | 0.73 | 0.49 |
| 15 | 904 | 904 | 0.78 | 0.52 |
| 16 | 968 | 968 | 0.84 | 0.56 |
| 17 | 1064 | 1064 | 0.92 | 0.61 |
| 18 | 1160 | 680 | 1.01 | 0.39 |
| 19 | 1288 | 752 | 1.12 | 0.44 |
| 20 | 1384 | 808 | 1.2 | 0.47 |
| 21 | 1480 | 864 | 1.28 | 0.50 |
| 22 | 1608 | 944 | 1.4 | 0.54 |
| 23 | 1736 | 1016 | 1.51 | 0.59 |
| 24 | 1800 | 1056 | 1.56 | 0.61 |
| 25 | 1864 | 1088 | 1.62 | 0.63 |
| 26 | 2216 | 1296 | 1.92 | 0.75 |

In the examples shown in Tables 3~8, it is assumed that no retransmission is configured, as in Tables 1~2. When retransmission is configured, e.g., when one retransmission is provided, Table 1 would become Table 9 below:

TABLE 9

Mapping from $I_{MCS}$ to $Q'_m$ and $I_{TBS}$ with One Retransmission

| MCS Index $I_{MCS}$ | Modulation Order $Q'_m$ | TBS Index $I_{TBS}$ | Coding Rate (1 retransmission) |
|---|---|---|---|
| 0 | 2 | 0 | 0.05 |
| 1 | 2 | 1 | 0.08 |
| 2 | 2 | 2 | 0.13 |
| 3 | 2 | 3 | 0.16 |
| 4 | 2 | 4 | 0.18 |
| 5 | 2 | 5 | 0.20 |
| 6 | 2 | 6 | 0.22 |
| 7 | 2 | 7 | 0.29 |
| 8 | 2 | 8 | 0.34 |

TABLE 9-continued

Mapping from $I_{MCS}$ to $Q'_m$ and $I_{TBS}$ with One Retransmission

| MCS Index $I_{MCS}$ | Modulation Order $Q'_m$ | TBS Index $I_{TBS}$ | Coding Rate (1 retransmission) |
|---|---|---|---|
| 9 | 2 | 9 | 0.40 |
| 10 | 2 | 10 | 0.22 |
| 11 | 4 | 10 | 0.44 |
| 12 | 4 | 11 | 0.26 |
| 13 | 4 | 12 | 0.30 |
| 14 | 4 | 13 | 0.33 |
| 15 | 4 | 14 | 0.37 |
| 16 | 4 | 15 | 0.39 |
| 17 | 4 | 16 | 0.42 |
| 18 | 4 | 17 | 0.46 |
| 19 | 4 | 18 | 0.51 |
| 20 | 4 | 19 | 0.56 |
| 21 | 4 | 19 | 0.56 |
| 22 | 4 | 20 | 0.60 |
| 23 | 4 | 21 | 0.64 |
| 24 | 4 | 22 | 0.70 |
| 25 | 4 | 23 | 0.76 |
| 26 | 4 | 24 | 0.78 |
| 27 | 4 | 25 | 0.81 |
| 28 | 4 | 26 | 0.96 |
| 29 | Reserved | | |
| 30 | | | |
| 31 | | | |

As the corresponding mapping from TBS indices ($I_{TBS}$) to TBSs (in unit of bits), the second column of Table 4 or Table 6 can be reused. It can be seen that, in Table 9, all the MCSs have coding rates lower than 0.93 except for $I_{MCS}$=28. That is, almost all the MCSs are decodable with one retransmission.

According to 3GPP TS 36.212 v14.1.1 (2017 January), Section 5.4.3.1.2, the SCI also contains a retransmission index. A terminal device can determine whether retransmission is configured based on this index.

Accordingly, in the step S110, the MCS index can be determined by the first terminal device by applying the first mapping when retransmission is configured, or the second mapping when no retransmission is configured and a modulation order and a TBS obtained by applying the first mapping would result in a coding rate higher than a predefined threshold (e.g., 0.93). Here, the first mapping may include two portions: a first portion in which each MCS index can be used regardless of whether retransmission is configured, and a second portion in which each MCS index can only be used when retransmission is configured. Accordingly, the second mapping may be the first portion of the first mapping. For example, the first mapping may include MCS indices 0~28 in Table 9 (or a scaled down version thereof), while the second mapping may include MCS indices 0~27 in Table 9 (or the accordingly scaled down version).

In an example, the method 100 may further include a step S120 in which the first terminal device transmits to the second terminal device an indicator indicating which of the first and second mappings is applied by the first terminal device. In this way, for example, when the second terminal device is a Release 15 V2X terminal, it can parse the MCS index to obtain the modulation order and the TBS in accordance with the same mapping as applied by the first terminal device. On the other hand, if the second terminal device is e.g., a Release 14 V2X terminal that cannot parse the indicator and/or cannot support the second mapping, it can simply ignore and discard the indicator.

Figure 2:
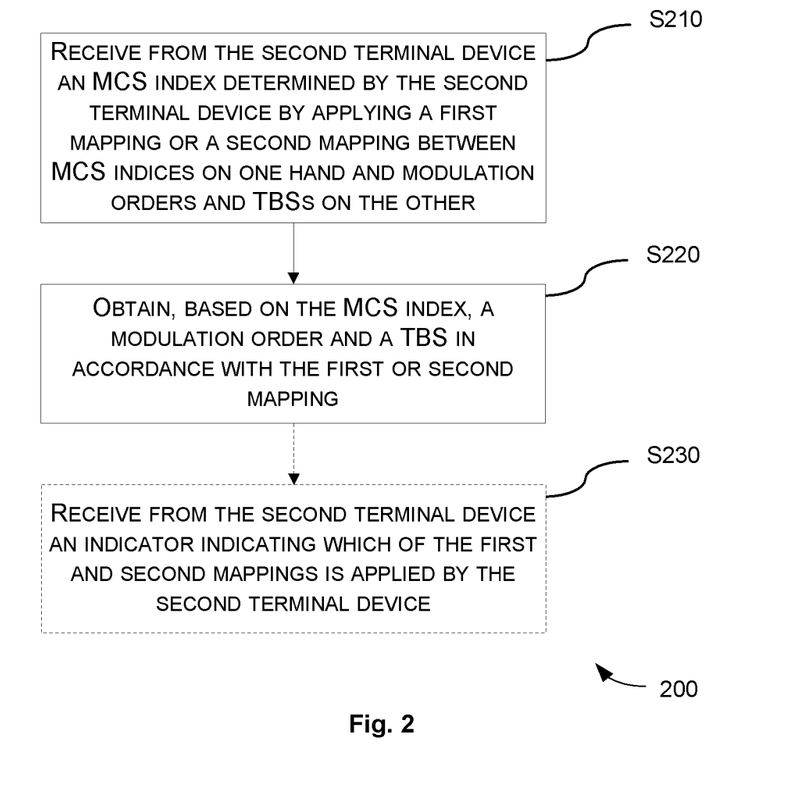
FIG. 2 is a flowchart illustrating a method for facilitating direct communication between terminals according to another embodiment of the present disclosure.

FIG. 2 is a flowchart illustrating a method 200 for facilitating direct communication between terminals according to an embodiment of the present disclosure. The method 100 can be performed at a first terminal device in direct communication with a second terminal device. The first and second terminal devices can communicate directly with each other on a sidelink for vehicular services. For example, the first terminal device can be a Release 15 V2X terminal as described above and the second terminal device can be a Release 14 or Release 15 V2X terminal.

At step S210, an MCS index is received from the second terminal device. The MCS index is determined by the second terminal device by applying a first mapping or a second mapping between MCS indices on one hand and modulation orders and TBSs on the other.

In an example, the second mapping can support a higher modulation order (e.g., 64QAM) than those supported by the first mapping (e.g., QPSK and 16QAM).

In an example, the first and second mappings can have an overlapped portion. The overlapped portion can be associated with one or more of modulation orders supported by both the first and second mappings. Additionally or alternatively, the overlapped portion can be associated with coding rates below a predefined threshold (e.g., 0.93). In a portion of the second mapping that does not overlap the first mapping, each TBS associated with the second mapping is scaled down with respect to a corresponding TBS associated with the first mapping by a factor dependent on a number of REs or OFDM symbols available for data transmission.

At step S220, a modulation order and a TBS are obtained based on the MCS index selectively in accordance with the first or second mapping.

In the step S220, the modulation order and the TBS can be obtained by the first terminal device selectively in accordance with the first mapping when retransmission is configured, or with the second mapping when no retransmission is configured and a modulation order and a TBS obtained in accordance with the first mapping would result in a coding rate higher than a predefined threshold (e.g., 0.93).

In an example, the second terminal device may support the first mapping only.

In an example, the method 200 may further include a step S230 in which the first terminal device receives from the second terminal device an indicator indicating which of the first and second mappings is applied by the second terminal device.

The examples described above in connection with FIG. 1 and the method 100, especially those related to Tables 3~9, are applicable to the method 200.

Figure 3:
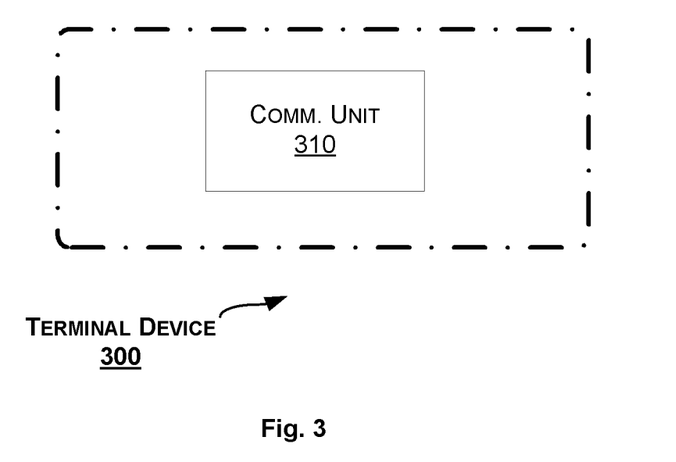
FIG. 3 is a block diagram of a terminal device according to an embodiment of the present disclosure.

Correspondingly to the method 100 as described above, a terminal device is provided. FIG. 3 is a block diagram of a first terminal device 300 in direct communication with a second terminal device according to an embodiment of the present disclosure.

As shown in FIG. 3, the terminal device 300 includes a communication unit 310 configured to transmit to the second terminal device an MCS index, based on which the second terminal device can obtain a modulation order and a TBS in accordance with a first mapping or a second mapping between MCS indices on one hand and modulation orders and TBSs on the other. The MCS index is determined by the first terminal device by selectively applying the first or second mapping.

In an embodiment, the second mapping supports a higher modulation order than those supported by the first mapping.

In an embodiment, the first and second mappings have an overlapped portion.

In an embodiment, the overlapped portion is associated with one or more of modulation orders supported by both the first and second mappings.

In an embodiment, the overlapped portion is associated with coding rates below a predefined threshold.

In an embodiment, in a portion of the second mapping that does not overlap the first mapping, each TBS associated with the second mapping is scaled down with respect to a corresponding TBS associated with the first mapping by a factor dependent on a number of Resource Elements, REs, available for data transmission.

In an embodiment, the MCS index is determined by the first terminal device by applying the first mapping when retransmission is configured, or the second mapping when no retransmission is configured and a modulation order and a TBS obtained by applying the first mapping would result in a coding rate higher than a predefined threshold.

In an embodiment, the communication unit 310 is further configured to transmit to the second terminal device an indicator indicating which of the first and second mappings is applied by the first terminal device.

In an embodiment, the second terminal device supports the first mapping only.

In an embodiment, the first and second terminal devices are communicating directly with each other on a sidelink for vehicular services.

The above unit 310 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 4:
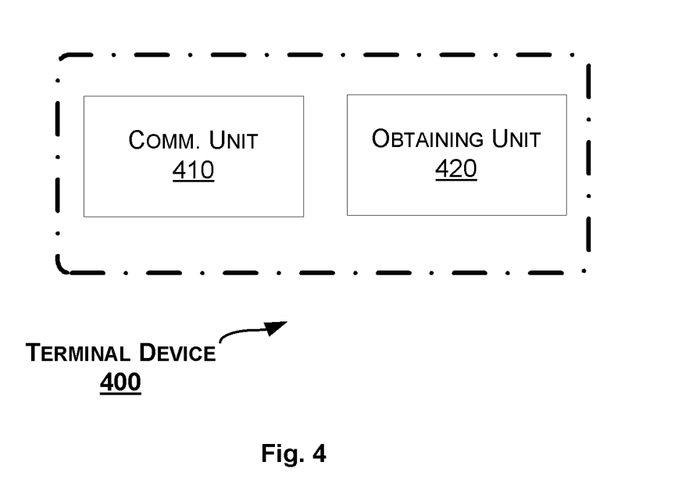
FIG. 4 is a block diagram of a terminal device according to another embodiment of the present disclosure.

Correspondingly to the method 200 as described above, a terminal device is provided. FIG. 4 is a block diagram of a terminal device 400 (which is referred to as the first terminal device hereafter) in direct communication with a second terminal device according to another embodiment of the present disclosure.

As shown in FIG. 4, the terminal device 400 includes a communication unit 410 configured to receive from the second terminal device an MCS index determined by the second terminal device by applying a first mapping or a second mapping between MCS indices on one hand and modulation orders and TBSs on the other. The terminal device 400 further includes an obtaining unit 420 configured to obtain, based on the MCS index, a modulation order and a TBS selectively in accordance with the first or second mapping.

In an embodiment, the second mapping supports a higher modulation order than those supported by the first mapping.

In an embodiment, the first and second mappings have an overlapped portion.

In an embodiment, the overlapped portion is associated with one or more of modulation orders supported by both the first and second mappings.

In an embodiment, the overlapped portion is associated with coding rates below a predefined threshold.

In an embodiment, in a portion of the second mapping that does not overlap the first mapping, each TBS associated with the second mapping is scaled down with respect to a corresponding TBS associated with the first mapping by a factor dependent on a number of Resource Elements, REs, available for data transmission.

In an embodiment, the modulation order and the TBS are obtained by the first terminal device selectively in accordance with the first mapping when retransmission is configured, or with the second mapping when no retransmission is configured and a modulation order and a TBS obtained in accordance with the first mapping would result in a coding rate higher than a predefined threshold.

In an embodiment, the communication unit 410 is further configured to receive from the second terminal device an indicator indicating which of the first and second mappings is applied by the second terminal device.

In an embodiment, the second terminal device supports the first mapping only.

In an embodiment, the first and second terminal devices are communicating directly with each other on a sidelink for vehicular services.

The above units 410-420 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 5:
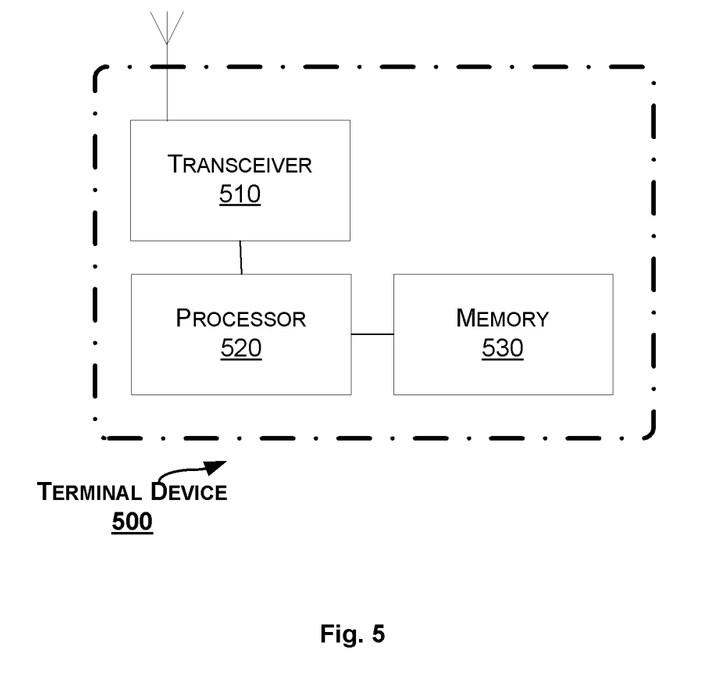
FIG. 5 is a block diagram of a terminal device according to yet another embodiment of the present disclosure.

FIG. 5 is a block diagram of a terminal device 500 according to yet another embodiment of the present disclosure. The terminal device 500 (referred to as "the first terminal device") is in direct communication with a second terminal device.

The terminal device 500 includes a transceiver 510, a processor 520 and a memory 530. The memory 530 contains instructions executable by the processor 520 whereby the terminal device 500 is operative to perform the actions, e.g., of the procedure described earlier in conjunction with FIG. 1. Particularly, the memory 530 contains instructions executable by the processor 520 whereby the terminal device 500 is operative to: transmit to the second terminal device an MCS index, based on which the second terminal device can obtain a modulation order and a TBS in accordance with a first mapping or a second mapping between MCS indices on one hand and modulation orders and TBSs on the other. The MCS index is determined by the first terminal device by selectively applying the first or second mapping.

In an embodiment, the second mapping supports a higher modulation order than those supported by the first mapping.

In an embodiment, the first and second mappings have an overlapped portion.

In an embodiment, the overlapped portion is associated with one or more of modulation orders supported by both the first and second mappings.

In an embodiment, the overlapped portion is associated with coding rates below a predefined threshold.

In an embodiment, in a portion of the second mapping that does not overlap the first mapping, each TBS associated with the second mapping is scaled down with respect to a corresponding TBS associated with the first mapping by a factor dependent on a number of Resource Elements, REs, available for data transmission.

In an embodiment, the MCS index is determined by the first terminal device by applying the first mapping when retransmission is configured, or the second mapping when no retransmission is configured and a modulation order and a TBS obtained by applying the first mapping would result in a coding rate higher than a predefined threshold.

In an embodiment, the memory 530 further contains instructions executable by the processor 520 whereby the terminal device 500 is operative to transmit to the second terminal device an indicator indicating which of the first and second mappings is applied by the first terminal device.

In an embodiment, the second terminal device supports the first mapping only.

In an embodiment, the first and second terminal devices are communicating directly with each other on a sidelink for vehicular services.

Additionally or alternatively, the memory 530 contains instructions executable by the processor 520 whereby the terminal device 500 is operative to perform the actions, e.g., of the procedure described earlier in conjunction with FIG. 2. Particularly, the memory 530 contains instructions executable by the processor 520 whereby the terminal device 500 is operative to: receive from the second terminal device an MCS index determined by the second terminal device by applying a first mapping or a second mapping between MCS indices on one hand and modulation orders and TBSs on the other; and obtain, based on the MCS index, a modulation order and a TBS selectively in accordance with the first or second mapping.

In an embodiment, the second mapping supports a higher modulation order than those supported by the first mapping.

In an embodiment, the first and second mappings have an overlapped portion.

In an embodiment, the overlapped portion is associated with one or more of modulation orders supported by both the first and second mappings.

In an embodiment, the overlapped portion is associated with coding rates below a predefined threshold.

In an embodiment, in a portion of the second mapping that does not overlap the first mapping, each TBS associated with the second mapping is scaled down with respect to a corresponding TBS associated with the first mapping by a factor dependent on a number of Resource Elements, REs, available for data transmission.

In an embodiment, the modulation order and the TBS are obtained by the first terminal device selectively in accordance with the first mapping when retransmission is configured, or with the second mapping when no retransmission is configured and a modulation order and a TBS obtained in accordance with the first mapping would result in a coding rate higher than a predefined threshold.

In an embodiment, the memory 530 further contains instructions executable by the processor 520 whereby the terminal device 500 is operative to receive from the second terminal device an indicator indicating which of the first and second 30 mappings is applied by the second terminal device.

In an embodiment, the second terminal device supports the first mapping only.

In an embodiment, the first and second terminal devices are communicating directly with each other on a sidelink for vehicular services.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 520 causes the terminal device 500 to perform the actions, e.g., of the procedure described earlier in conjunction with FIG. 1 or 2.

The computer program product may be configured as a computer program code structured in computer program modules. The computer program modules could essentially perform the actions of the flow illustrated in FIG. 1 or 2.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a first terminal device for facilitating direct communication with a second terminal device, where the direct communication is a sidelink communication for vehicular services, comprising:
    transmitting to the second terminal device a Modulation and Coding Scheme (MCS) index that corresponds to one of a first mapping of a set of MCS indexes and a second mapping of the set of MCS indexes, wherein each MCS index is associated with a modulation order and a Transport Block Size (TBS) index in the first mapping and associated with a modulation order and a TBS index in the second mapping, in which the first mapping and the second mapping have an overlapped portion of same MCS indexes with corresponding same modulation order and TBS indexes, in which each TBS index maps to a corresponding same Physical Resource Blocks (PRBs) between the first mapping and the second mapping for the overlapped portion and to a corresponding different PRBs between the first mapping and the second mapping for the non-overlapped portion, in order for the second terminal device, in response to receiving the MCS index, to identify the modulation order and TBS index by the MCS index and identify a number of PRBs by the TBS index based on the first mapping or the second mapping to communicate with the first terminal device;
    wherein the MCS index is determined by the first terminal device by selectively applying the first mapping or the second mapping for communicating with the second terminal device.

2. The method of claim 1, wherein the non-overlapped portion of the second mapping supports a higher modulation order than modulation orders supported by the first mapping.

3. The method of claim 1, wherein the overlapped portion is associated with coding rates below a predefined threshold.

4. The method of claim 3, wherein, in a portion of the second mapping that does not overlap the first mapping, each TBS associated with the second mapping is scaled down with respect to a corresponding TBS associated with the first mapping by a factor dependent on a number of Resource Elements (REs) available for data transmission.

5. The method of claim 1, wherein the MCS index is determined by the first terminal device by applying the first mapping when retransmission is configured, or the second mapping when no retransmission is configured and a modulation order and a TBS obtained by applying the first mapping would result in a coding rate higher than a predefined threshold.

6. The method of claim 1, further comprising:
transmitting to the second terminal device an indicator indicating which of the first and second mappings is applied by the first terminal device.

7. A method in a first terminal device for facilitating direct communication with a second terminal device, where the direct communication is a sidelink communication for vehicular service, comprising:
receiving from the second terminal device a Modulation and Coding Scheme (MCS) index that corresponds to one of a first mapping of a set of MCS indexes and a second mapping of the set of MCS indexes, wherein each MCS index is associated with a modulation order and a Transport Block Size (TBS) index in the first mapping and associated with a modulation order and a TBS index in the second mapping, in which the first mapping and the second mapping have an overlapped portion of same MCS indexes with corresponding same modulation order and TBS indexes, in which each TBS index maps to a corresponding same Physical Resource Blocks (PRBs) between the first mapping and the second mapping for the overlapped portion and to a corresponding different PRBs between the first mapping and the second mapping for the non-overlapped portion; and
identifying the modulation order and the TBS index by the MCS index and corresponding mapping of the MCS index to the first mapping or the second mapping and identifying a number of PRBs by the TBS index and the corresponding mapping of the MCS index to the first mapping or the second mapping.

8. The method of claim 7, wherein the non-overlapped portion of the second mapping supports a higher modulation order than modulation orders supported by the first mapping.

9. The method of claim 7, wherein the overlapped portion is associated with coding rates below a predefined threshold.

10. The method of claim 9, wherein, in a portion of the second mapping that does not overlap the first mapping, each TBS associated with the second mapping is scaled down with respect to a corresponding TBS associated with the first mapping by a factor dependent on a number of Resource Elements (REs) available for data transmission.

11. The method of claim 7, wherein the modulation order and the TBS are obtained by the first terminal device in accordance with the first mapping when retransmission is configured, or with the second mapping when no retransmission is configured and a modulation order and a TBS obtained in accordance with the first mapping would result in a coding rate higher than a predefined threshold.

12. The method of claim 7, further comprising:
receiving from the second terminal device an indicator indicating which of the first and second mappings is applied by the second terminal device.

13. A first terminal device in direct communication with a second terminal device, where the direct communication is a sidelink communication for vehicular service, the first terminal device comprising:
a transceiver;
a processor coupled to the transceiver; and
a memory comprising instructions which, when executed by the processor, cause the first terminal device to perform operations to:
transmit to the second terminal device a Modulation and Coding Scheme (MCS) index that corresponds to one of a first mapping of a set of MCS indexes and a second mapping of the set of MCS indexes, wherein each MCS index is associated with a modulation order and a Transport Block Size (TBS) index in the first mapping and associated with a modulation order and a TBS index in the second mapping, in which the first mapping and the second mapping have an overlapped portion of same MCS indexes with corresponding same modulation order and TBS indexes, in which each TBS index maps to a corresponding same Physical Resource Blocks (PRBs) between the first mapping and the second mapping for the overlapped portion and to a corresponding different PRBs between the first mapping and the second mapping for the non-overlapped portion, in order for the second terminal device, in response to receiving the MCS index, to identify the modulation order and TBS index by the MCS index and identify a number of PRBs by the TBS index based on the first mapping or the second mapping to communicate with the first terminal device;
wherein the MCS index is determined by the first terminal device by selectively applying the first mapping or the second mapping for communicating with the second terminal device.

* * * * *